United States Patent [19]
Cruce et al.

[11] Patent Number: 5,660,784
[45] Date of Patent: Aug. 26, 1997

[54] METHOD OF MAKING PLASTIC OPEN FRAME BASKET CONSTRUCTION

[76] Inventors: Christopher J. Cruce, 404 Encinitas Blvd. #287, Encinitas, Calif. 92024; Jorma P. Ripatti, 114 E. Huntington Rd., Alhambra, Calif. 91801

[21] Appl. No.: 445,284

[22] Filed: May 19, 1995

Related U.S. Application Data

[62] Division of Ser. No. 188,214, Jan. 27, 1994, Pat. No. 5,549,215.

[51] Int. Cl.⁶ ............................ B65D 21/04; B29C 45/40
[52] U.S. Cl. ................... 264/328.1; 206/516; 220/607; 220/676; 249/60; 264/334; 425/577; 425/443
[58] Field of Search ................. 220/676, 607; 206/515, 516; 264/328.1, 334, 328.9, 328.12; 249/60, 63; 425/DIG. 58, 577, 438, 443

[56] References Cited

U.S. PATENT DOCUMENTS

| | | | |
|---|---|---|---|
| D. 212,074 | 8/1968 | Woodruff et al. | 220/607 |
| 1,992,332 | 2/1935 | Spencer | 249/60 |
| 2,556,590 | 6/1951 | Long | 220/676 |
| 2,649,991 | 8/1953 | Woock | 220/676 |
| 3,236,410 | 2/1966 | Swartz | 220/676 |
| 3,264,396 | 8/1966 | Beesley et al. | 264/328.12 |
| 3,286,877 | 11/1966 | Haimes | 220/676 |
| 3,323,174 | 6/1967 | Fallscheer | 249/60 |
| 3,543,338 | 12/1970 | Cooper | 249/60 |
| 3,642,967 | 2/1972 | Doll | 220/676 |
| 3,729,112 | 4/1973 | Gibbs | 220/404 |
| 3,917,789 | 11/1975 | Heisler | 264/328.12 |
| 4,140,828 | 2/1979 | Copping | 264/328.12 |
| 4,157,145 | 6/1979 | Jordan | 220/676 |
| 4,176,747 | 12/1979 | Aho | 220/676 |
| 4,478,344 | 10/1984 | Rehrig | 220/676 |
| 4,731,014 | 3/1988 | Von Holdt | 425/DIG. 58 |
| 5,145,082 | 9/1992 | Craft, Jr. et al. | 220/676 |
| 5,549,215 | 8/1996 | Cruce et al. | 220/676 |

FOREIGN PATENT DOCUMENTS

2704734  9/1977  Germany ........................ 249/60

*Primary Examiner*—Jill L. Heitbrink
*Attorney, Agent, or Firm*—Bernard L. Kleinke; Peter P. Scott

[57] ABSTRACT

A plastic open frame basket is made by molding from plastic material, a tapered body portion, having integrally interconnected smoothly contoured longitudinal rib members and cross members in an interconnected, open frame configuration. A plurality of raised diagonal parting lines extend between said outer and inner corners formed by adjacent cross members to define a stepped configuration, thereby enabling the resulting plastic molded open frame basket to be made from a relatively inexpensive mold apparatus.

4 Claims, 8 Drawing Sheets

METHOD OF MAKING PLASTIC OPEN FRAME BASKET CONSTRUCTION

This patent application is a divisional patent application of patent application Ser. No. 08/188,214, filed Jan. 27, 1994, now U.S. Pat. No. 5,549,215.

TECHNICAL FIELD

The present invention relates to an open frame plastic basket and a method of making it. More particularly, it relates to a plastic basket having an open frame construction for receiving objects, such as golf balls, for use at a driving range where the game of golf may be practiced.

BACKGROUND ART

Baskets of all sizes and shapes have been in existence for some time, because there has always been a need to transport or store items which were not readily transported or stored by hand. Examples of such object include rice, grain, clothing, and many others. The earliest forms of baskets, as well as some present day ones, were made by interweaving materials derived from plants.

A modern example is a metal, open frame wire basket, used at driving ranges for transporting a quantity of golf balls.

Such baskets for the transportation and storage of golf balls, referred to as "range baskets," frequently found at golf driving ranges, have been manufactured from metal rods welded or otherwise suitably fixed together, to form a metal basket construction having a carrying handle or bail. Baskets so formed have been made of an open frame construction, wherein the interconnected metal rod elements have been spaced from one another to form gaps or openings. The openings are sufficiently small in size to confine the golf balls within the basket. However, they are sufficiently large in size to permit the user to readily perceive the group of golf balls stored within the basket.

While such metal wire baskets have been satisfactory for some applications, they have been susceptible to being damaged by rust, since they are primarily used outdoors. In this regard, the baskets have been exposed to rain, snow, and other weather conditions. As the baskets are made of metal, the weather conditions tend to lead to the formation of rust. Eventually, excessive oxidation can destroy or otherwise render the basket unsuitable for its intended purpose. The integrity of the basket can deteriorate to the point where it becomes useless, and must then be replaced.

Another disadvantage of metal wire range baskets, is that should the welds be defective, the wire joints can be dislodged. As a result, the basket then looses the structural integrity, and breaks apart. Such a basket must then be replaced.

Additionally, the weight of the heavy metal baskets is a serious drawback. While a single basket is not especially heavy, when several empty metal baskets are combined in a nested fashion, the overall weight becomes increasingly burdensome. In this regard, the wire baskets are tapered so that the baskets fit one within the other.

Nesting of the baskets is desirable and important for golf ball driving ranges. In this regard, several baskets can be readily carried by hand by only one person, thereby reducing the amount of time to transport the empty baskets. Also, nesting the baskets permits a larger number of baskets to be stored in a smaller area.

Another problem in the nesting of metal baskets relates to the wire elements, which become bent out of shape during use. Such bent portions make it more difficult to nest the baskets, because the heavy wire elements of nested baskets engage one another, and the bent portions tend to lock the nested baskets together. Thus, the baskets could not be readily nested, and then later could not be easily separated.

An additional disadvantage of the conventional wire basket is that it includes a rotatable handle, which is capable of falling into the interior of the basket. When a handle falls into such a position, the nesting of the baskets was made to be impracticable, if not impossible.

If an open frame could somehow be entirely made from thermoplastic material, it would be lightweight and rust resistant. If such a plastic basket could be injection molded with a tapered body, such a basket could be successfully used as a driving range golf ball basket.

In order to make a plastic basket with a tapered body and having an open frame construction, a multiple part mold would be required. Such a mold having many parts, would be unduly complex, and excessively expensive to manufacture. Thus, the resulting parts would be excessively expensive.

Thus, it would be highly desirable to be able to injection mold such an open frame basket, by a less expensive mold arrangement, such as a two part mold. The resulting basket would have to have the desired tapered, open frame construction.

One approach could be to make the open frame basket with a stepped sidewall, so that the basket could be injection molded with only two mold parts. Such plastic basket would be a radical departure from the relatively smooth tapered sidewall of the metal wire baskets. Such a substantially different appearance would be totally unacceptable to the driving ranges.

Thus, it would be highly desirable to have a plastic open frame basket which can be constructed from a two part mold. Such a plastic basket should have a smoothly tapered body and be relatively inexpensive to manufacture.

Such a plastic open frame basket should not only be lightweight, but it must also be structurally strong to withstand heavy use, which is customary at commercial driving ranges. In addition to being strong, the basket must be durable and capable of withstanding repeated and sustained abuse.

DISCLOSURE OF INVENTION

Therefore, the principal object of the present invention is to provide a new and improved plastic open frame basket, and a method of manufacturing it, having a smooth tapered body portion, without requiring the use of unduly expensive molding techniques.

Another object of the present invention is to provide such a new and improved plastic open frame basket, and a method of manufacturing it, such that the basket is relatively inexpensive to manufacture, is light in weight, and is strong and durable to withstand repeated heavy use, such as the use subjected to at a golf driving range.

Briefly, the above and further objects of the present invention are realized by providing a plastic open frame basket, and a method of manufacturing it, such that the basket has a smooth tapered body and can be produced relatively inexpensively. The basket is lightweight, strong, and durable.

A plastic open frame basket is made by molding from plastic material, a tapered body portion, having integrally interconnected smoothly contoured longitudinal rib members and cross members in an interconnected, open frame configuration. A plurality of raised diagonal parting lines extend between said outer and inner corners formed by adjacent cross members to define a stepped configuration, thereby enabling the resulting plastic molded open frame basket to be made from a relatively inexpensive mold apparatus.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Referring now to the drawings, and more particularly to FIGS. 1, 1A, 4, and 5 thereof, there is shown a plastic open frame basket construction 10, which is constructed according to the present invention. The basket construction 10 is preferably used as a driving range basket for storing and transporting a quantity of golf balls (not shown). However, it will become apparent to those skilled in the art that the construction 10 can also be used for other applications, such as garden plants and others.

The construction 10 has an open top and smoothly tapered side walls. The construction 10 includes a rim member 12, and a bail or handle 16 connected pivotally across the rim member 12, to serve as a carrying handle a circular inwardly dished base or bottom wall 18 helps to rigidity and strengthen the construction 10. A plurality of rectilinear, smoothly contoured longitudinal rib members, such as longitudinal rib members 30, 32, 34, and 36, are integrally connected between the bottom wall 18 and the rim member 12 to form a smoothly tapered body portion 40 having an interior space 42.

A plurality of curved cross rib members, such as cross rib members 50, 52, 54, and 56, are integrally connected between adjacent longitudinal rib members, such as longitudinal rib members 30 and 32, and 32 and 34, to form concentric circular rings, such as rings 60 and 62, respectively. Adjacent concentric rings 60 and 62 differ in size to cause the body portion 40 to be tapered. In this manner, the basket construction 10 is nestable as indicated in FIG. 5.

Figures 1, 1A:
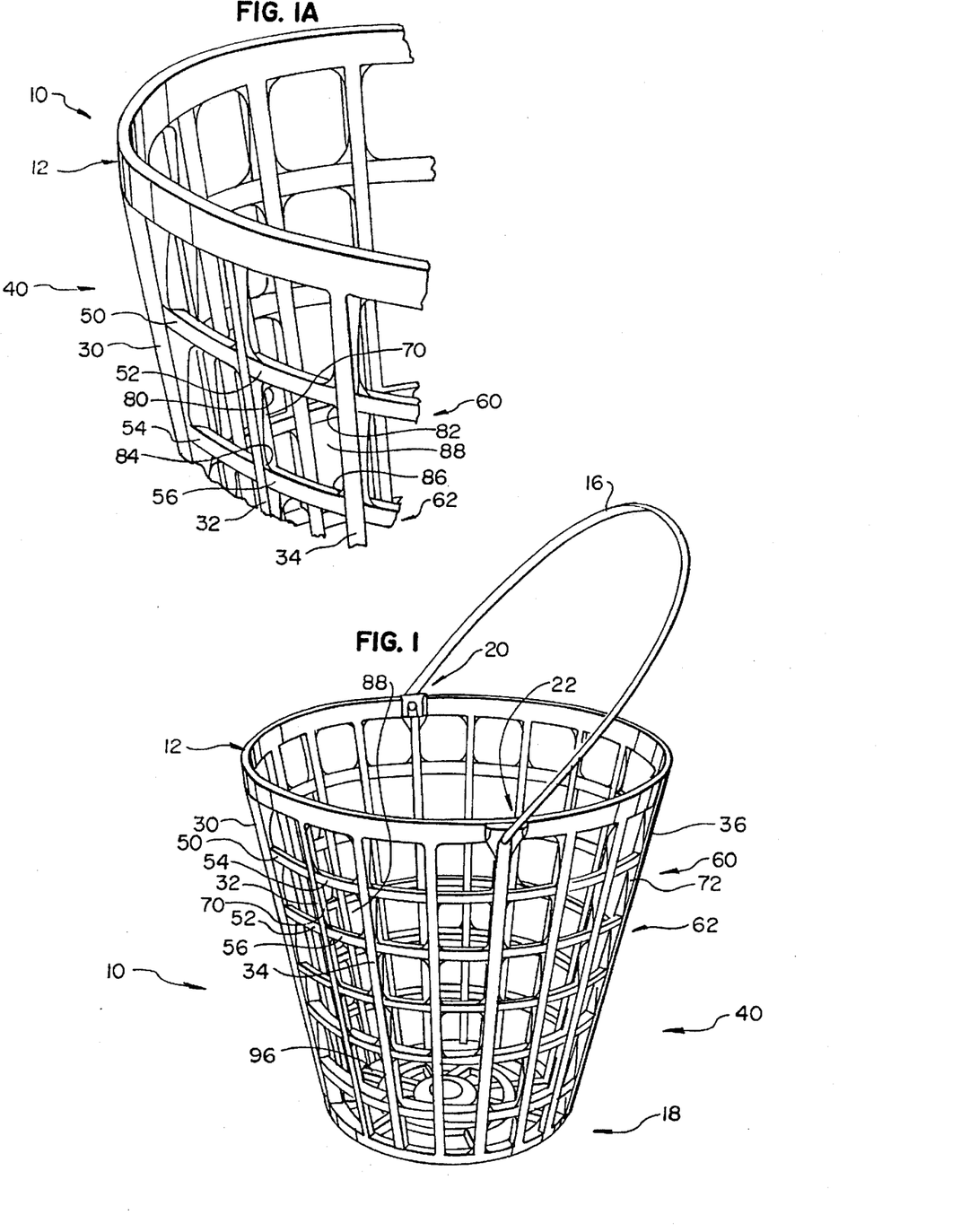
FIG. 1 is a pictorial view of a plastic open frame basket construction, which is constructed in accordance with the present invention.
FIG. 1A is an enlarged fragmentary detail portion of the basket construction of FIG. 1, illustrating at least some of the parting lines and reinforcing webs of the basket construction.
Figure 2:
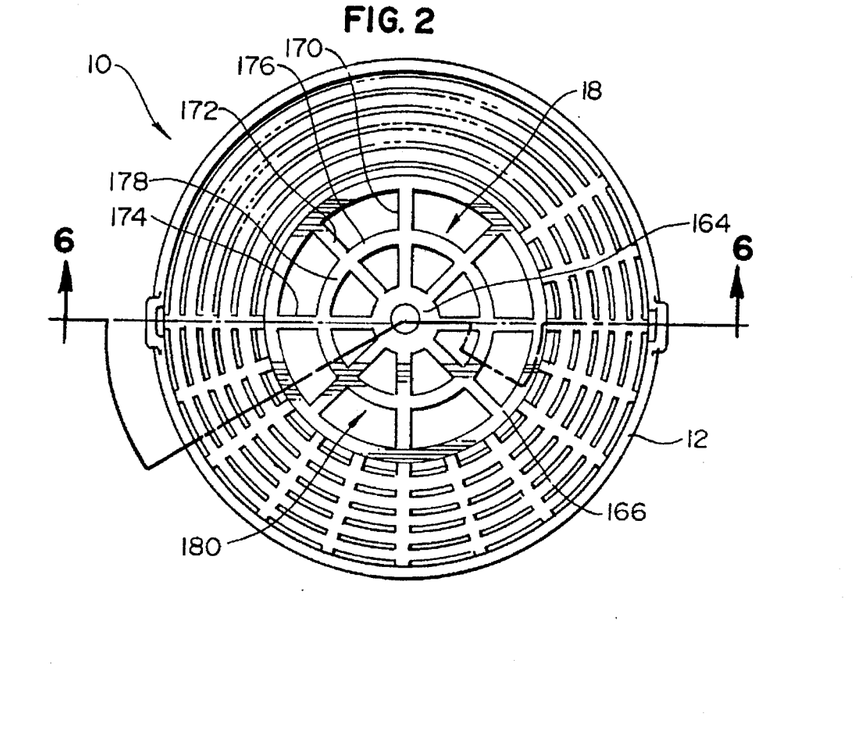
FIG. 2 is top view of the basket construction of FIG. 1.
Figure 3:
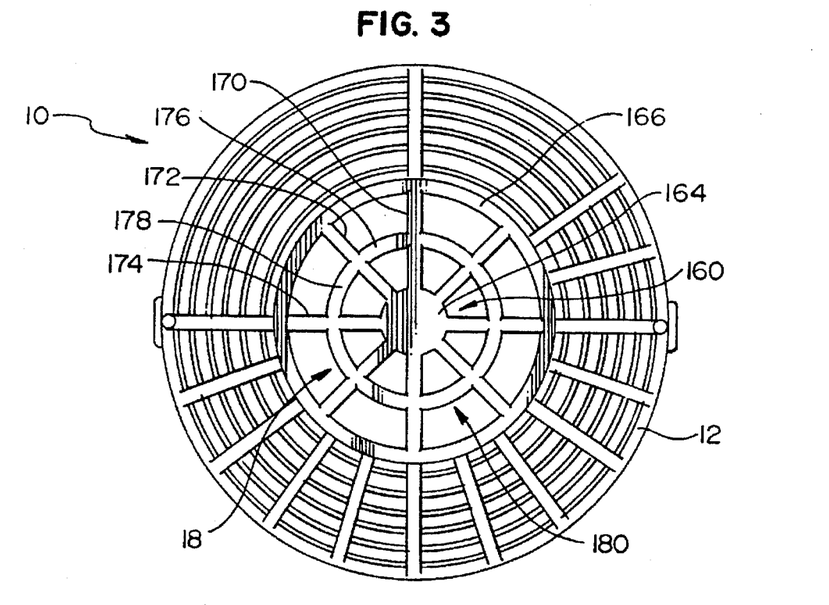
FIG. 3 is a bottom view of the basket construction of FIG. 1.
Figure 4:
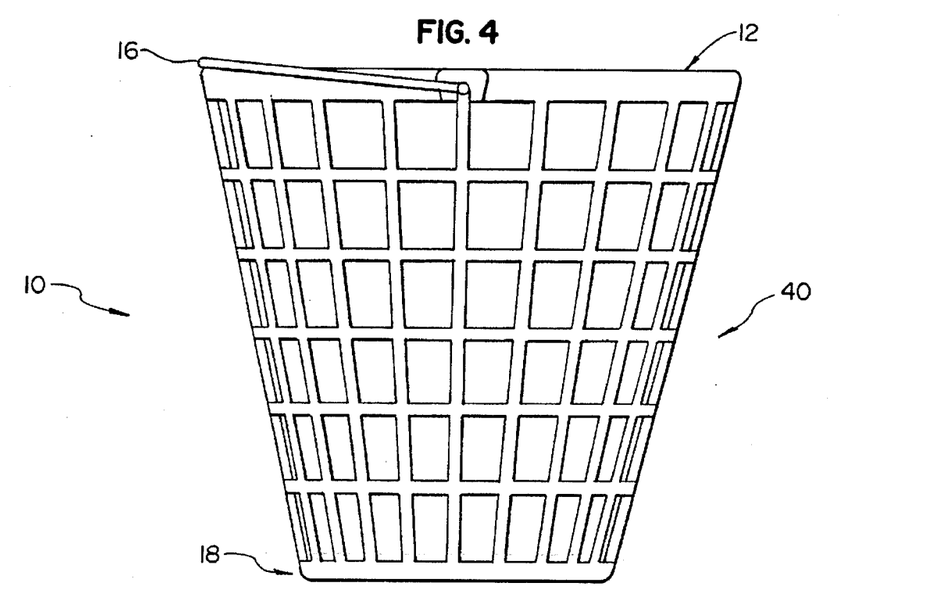
FIG. 4 is an elevational, slightly enlarged view of basket construction of FIG. 1.

A plurality of integral, diagonal raised parting lines, such as diagonal parting lines 70 and 72, are disposed on the outer surface of the longitudinal rib members 32 and 36, respectively, and extend between inner rigidifying radius webs, such as inner radius webs 80 and 82, and outer radius webs, such as outer radius webs 84 and 86. The diagonal parting lines of adjacent facing longitudinal rib members, such as longitudinal rib members 32 and 34, and the associated inner and outer radius webs 80, 82, 84, and 86, form generally rectangular openings, such as an opening 88.

In accordance with the present invention, as will become apparent hereinafter, the diagonal parting line arrangement results from the inventive method of molding the basket 10. In this regard, only two mold parts are required, and the tapered body portion of the resulting basket construction 10 has a smooth, straight appearance.

Figure 5:
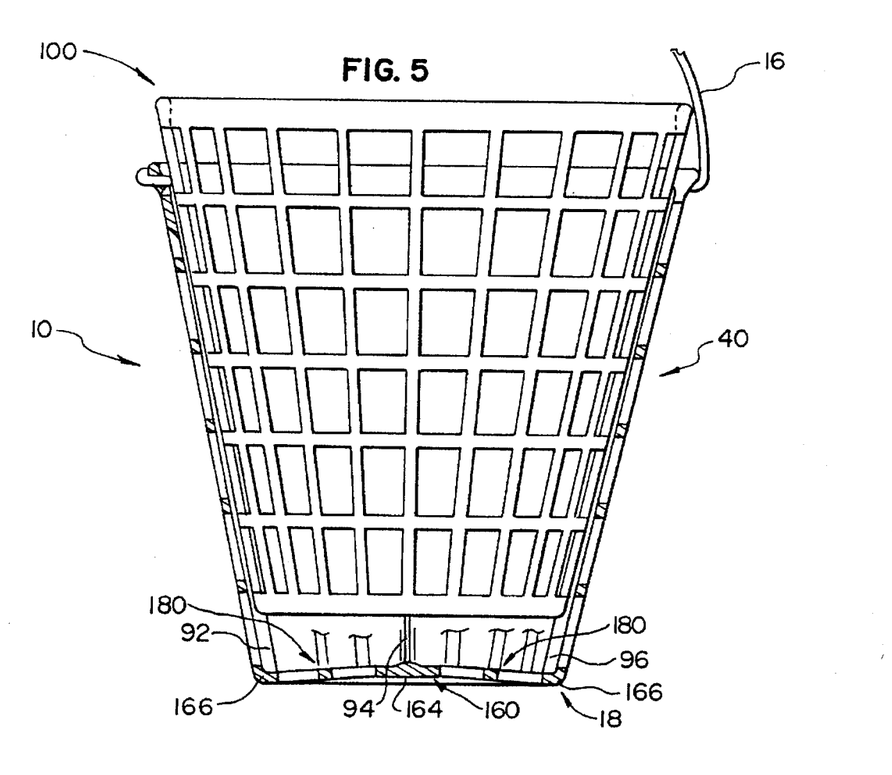
FIG. 5 is an elevational, partially broken away view of like plastic open frame basket constructions nested together.
Figures 6, 7, 8:
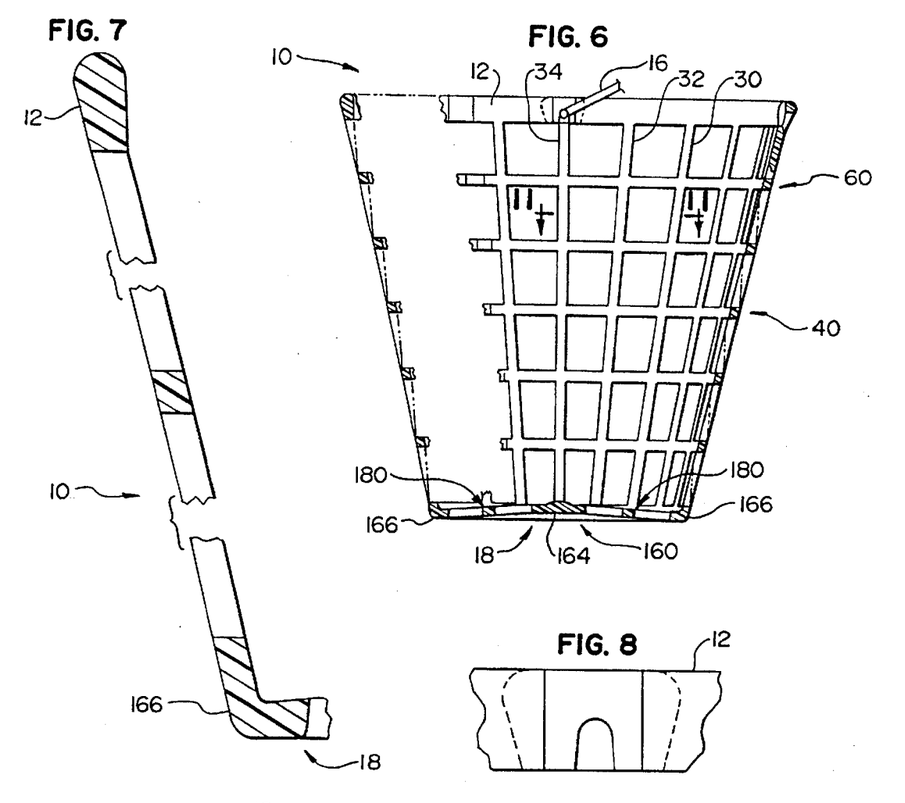
FIG. 6 is a partial-sectional view of the basket construction of FIG. 2, taken substantially one line 6—6 thereof.
FIG. 7 is a greatly enlarged fragmentary sectional view of the basket construction of FIG. 6.
FIG. 8 is an enlarged detail sectional view of the basket construction of FIG. 6, illustrating the outside surface of a bail attachment area with the bail removed for illustration purposes.
Figure 9:
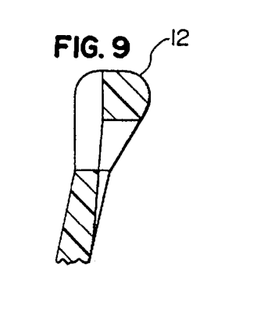
FIG. 9 is an enlarged detail sectional view of the basket construction of FIG. 6, illustrating the bail cross hole of the bail attachment area of FIG. 8 with the bail removed for illustration purposes.
Figure 10:
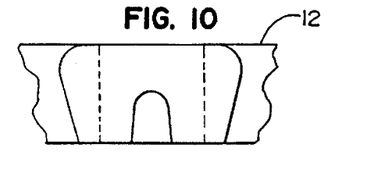
FIG. 10 is an enlarged detail sectional view of the basket construction of FIG. 8, illustrating the inside surface of the bail attachment of FIG. 8.
Figure 11:
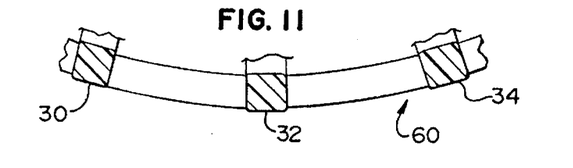
FIG. 11 is an enlarged, fragmentary sectional view of the basket construction of FIG. 6, taken on line 11—11 thereof.
Figure 12:
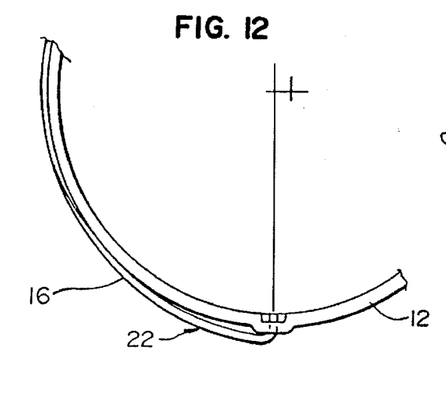
FIG. 12 is a fragmentary, top view of the basket construction of FIG. 4.
Figure 13:
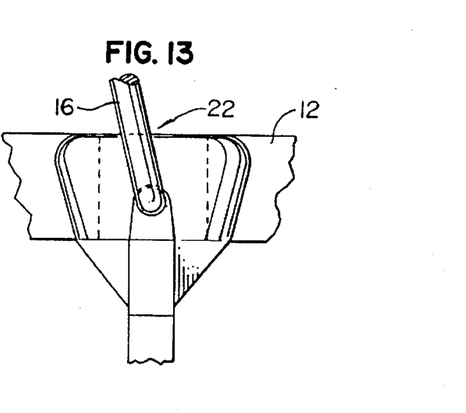
FIG. 13 is an enlarged, fragmentary detail elevational view of the bail attachment area of FIG. 8, illustrating an end of the bail attached thereto.
Figure 14:
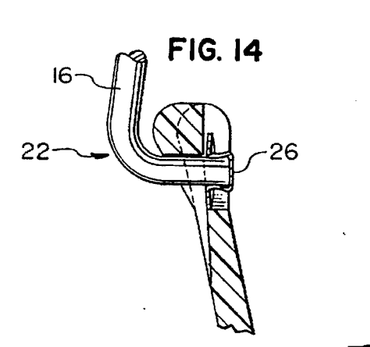
FIG. 14 is an enlarged, fragmentary detail elevational view of the bail attachment area of FIG. 9, illustrating an end of the bail attached thereto.
Figure 15:
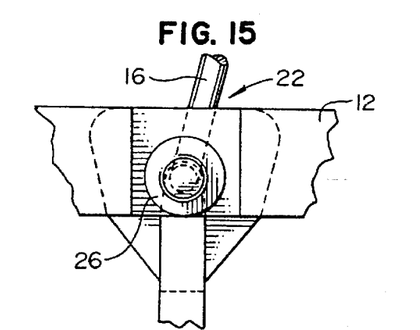
FIG. 15 is an enlarged fragmentary detail elevational view of the bail attachment area of FIG. 10, illustrating an end o the bail attached thereto.
Figure 16:
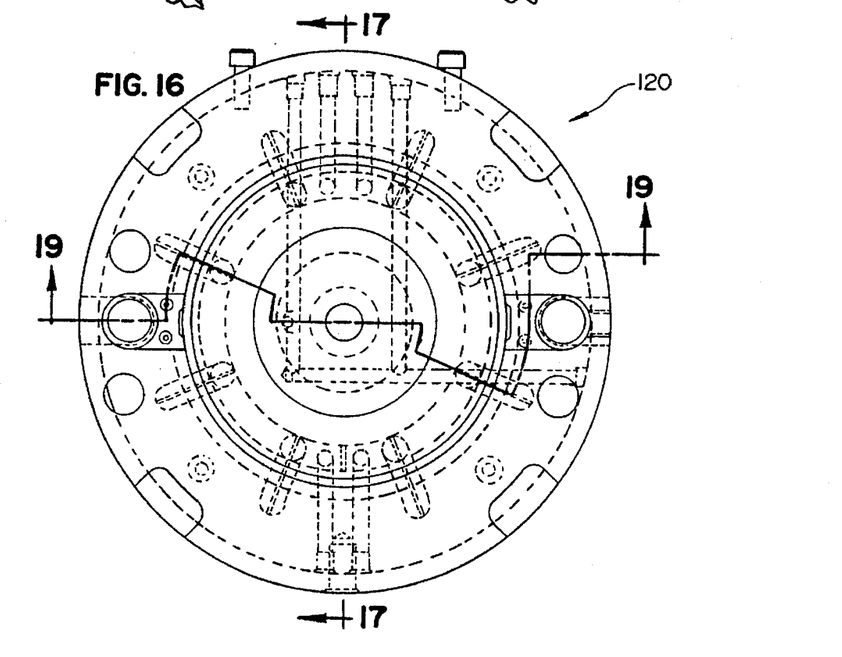
FIG. 16 is a partially diagrammatic plan view of an outer cavity mold portion of an injection mold assembly for manufacturing the basket construction of FIG. 1.

As shown in FIG. 5, a plurality of annular stacking ribs, such as stacking ribs 90, 92, and 94 are disposed about the inner circumference of bottom wall 18 in the interior space 42 to receive and support the bottom wall of a like basket. In this manner, as best seen in FIG. 5, the stacking or nesting of plastic open frame basket constructions, such as basket construction 10 and a like basket construction 100, can be accomplished.

Referring now to FIGS. 16, 17, 17A, 18, and 19, there is shown a mold 110 for making a plastic open frame basket construction, such as basket construction 10, which is constructed according to the present invention.

Figure 17:
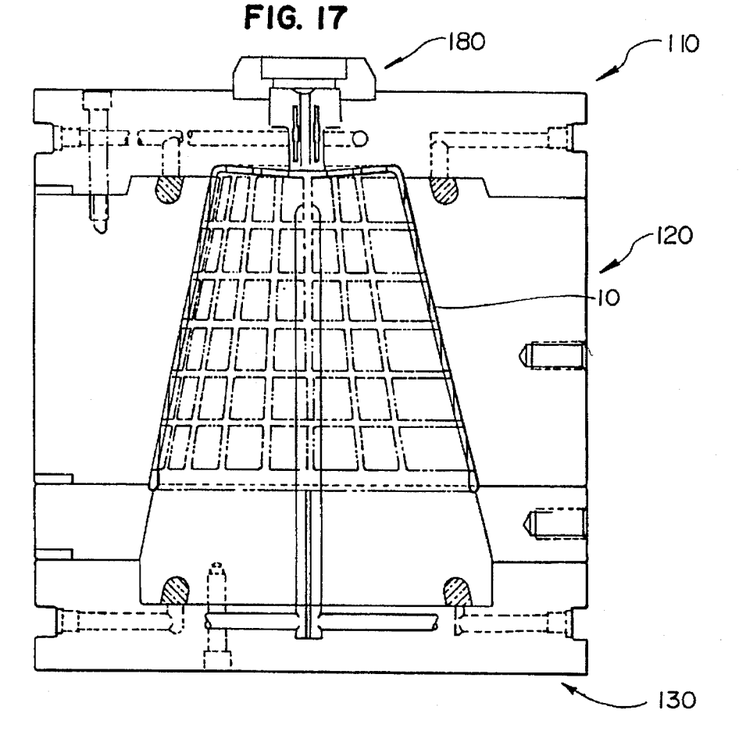
FIG. 17 is an elevational cross section of the mold assembly of FIG. 16, taken substantially on line 17—17 thereof, illustrating the basket of FIG. 1 in the process of being molded in place.

The mold 110 is a two part mold and includes an outer cavity or hot mold portion 120 and an inner core or ejection mold portion 130 which conforms to the cavity mold portion 120, wherein the core mold portion 130 moves reciprocatively in and out of engagement with the cavity mold portion 120 to form the basket construction 10, indicated by broken lines in FIG. 17, by injection molding.

Figure 17A:
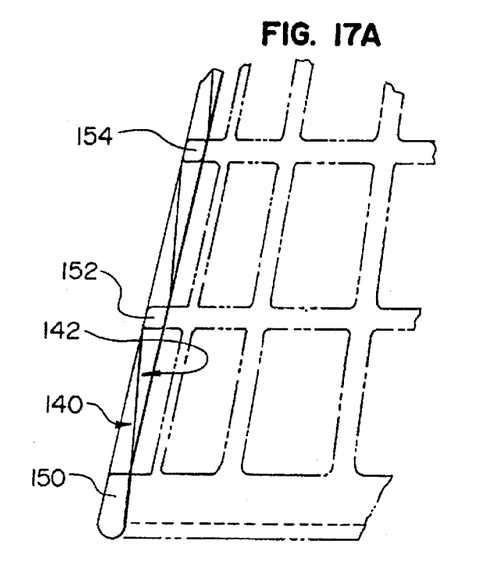
FIG. 17A is a greatly enlarged view of the mold assembly of FIG. 17.
Figure 18:
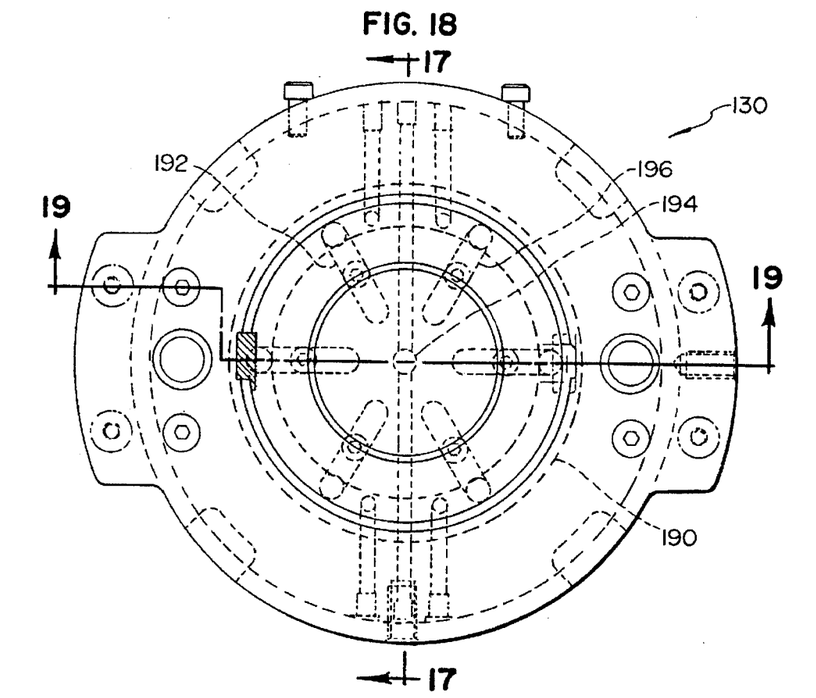
FIG. 18 is a partially diagrammatic plan view of an inner core mold portion of the mold assembly which is combined with the outer cavity mold portion of FIG. 16 to form the basket of FIG. 1.

As best seen in FIG. 17A, mold portions 120 and 130 have complementary shaped diagonally shaped mating surfaces 140 and 142, respectively, which form the diagonal parting lines, such as parting lines 70 and 72, of the basket construction 10. When brought into contact with each other, mating surfaces 140 and 142 form a plurality of interconnected cavities, such as annular cavities 150, and 152, and 154, to receive injected molten thermoplastic material therein. In this regard, cavities 150, 152, and 154 form the rim member 12, and concentric rings 60 and 62, respectively.

Considering now the basket construction 10 in greater detail with reference to FIGS. 1 and 1A, the generally rectangular openings, such as opening 88, formed by the diagonal parting lines of adjacent facing longitudinal rib members, such as longitudinal rib members 32 and 34,.and the associated inner and outer radius webs 80, 82, 84, and 86, have varying shapes, depending on the axial location of the opening. In this regard, the opening 88 is close to the rim member 12 and is substantially square while an opening close to the base wall 18, such as opening 96, is longer in one dimension than in the other.

As best seen in FIGS. 2, 3, 5, and 6, the inwardly dished base wall 18 has an open frame construction. The base wall 18 includes a central hub member 164 having an exterior surface 160, an outer edge portion 166, and a plurality of radiating spoke members, such as spoke members 170, 172, and 174, disposed therebetween. A plurality of curved base cross members, such as base cross members 176 and 178, are disposed between adjacent spoke members 170 and 172, and spoke members 172 and 174, and are aligned to define a concentric base ring 180.

As best seen in FIGS. 1, 12, 13, 14, and 15, terminal ends 20 and 22 of the bail 16 are rotatably connected to the rim member 12 and held in place by a pair of rivets 24 and 26, respectively.

Figure 19:
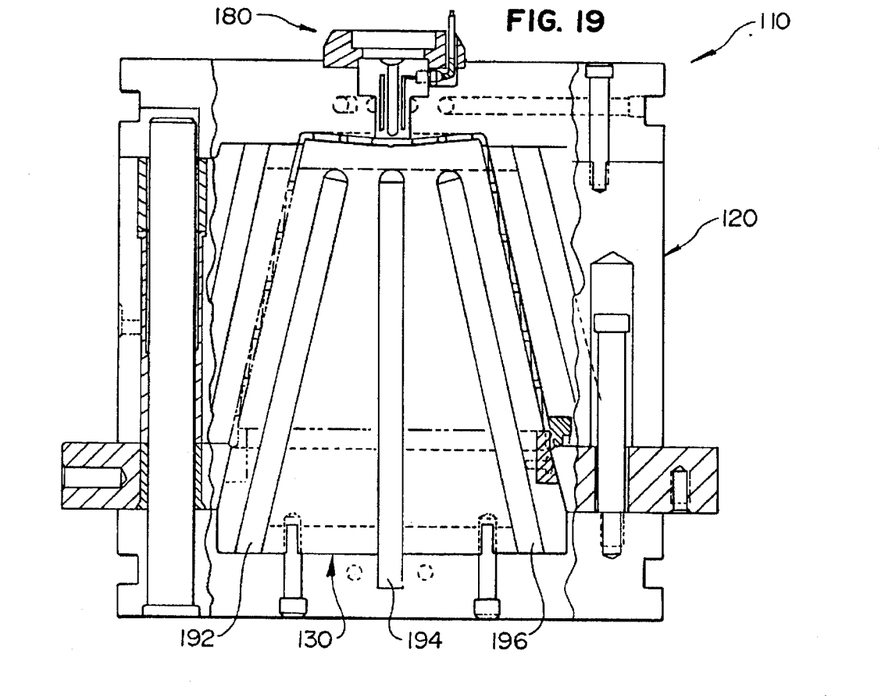
FIG. 19 is a partially diagrammatic elevational sectional view of the mold assembly of FIG. 16, taken substantially on line 19—19 thereof.

Considering now the mold 110 in greater detail with reference to FIGS. 17 and 19, the mold 110 is positioned with the outer cavity mold 120 above the inner core mold 130, wherein the basket construction 10 is formed in an inverted position. The mold 110 includes a single sprue 180 for supplying molten thermoplastic material to the mold 110, wherein the molten thermoplastic material is introduced into the cavities, such as cavities 150, 152, and 154, through a central hub cavity (not shown). As the cavities, including cavities 150, 152, and 154, are in fluid communication with one another, the molten material flows downwardly from the central hub cavity until all of the cavities are completely filled.

For cooling purposes, the inner core mold portion 130 includes a manifold 190 in fluid communication with metallic baffles, such as baffles 192, 194, and 196, to circulate coolant within the mold 110 for removing heat from therewithin.

Figure 20:
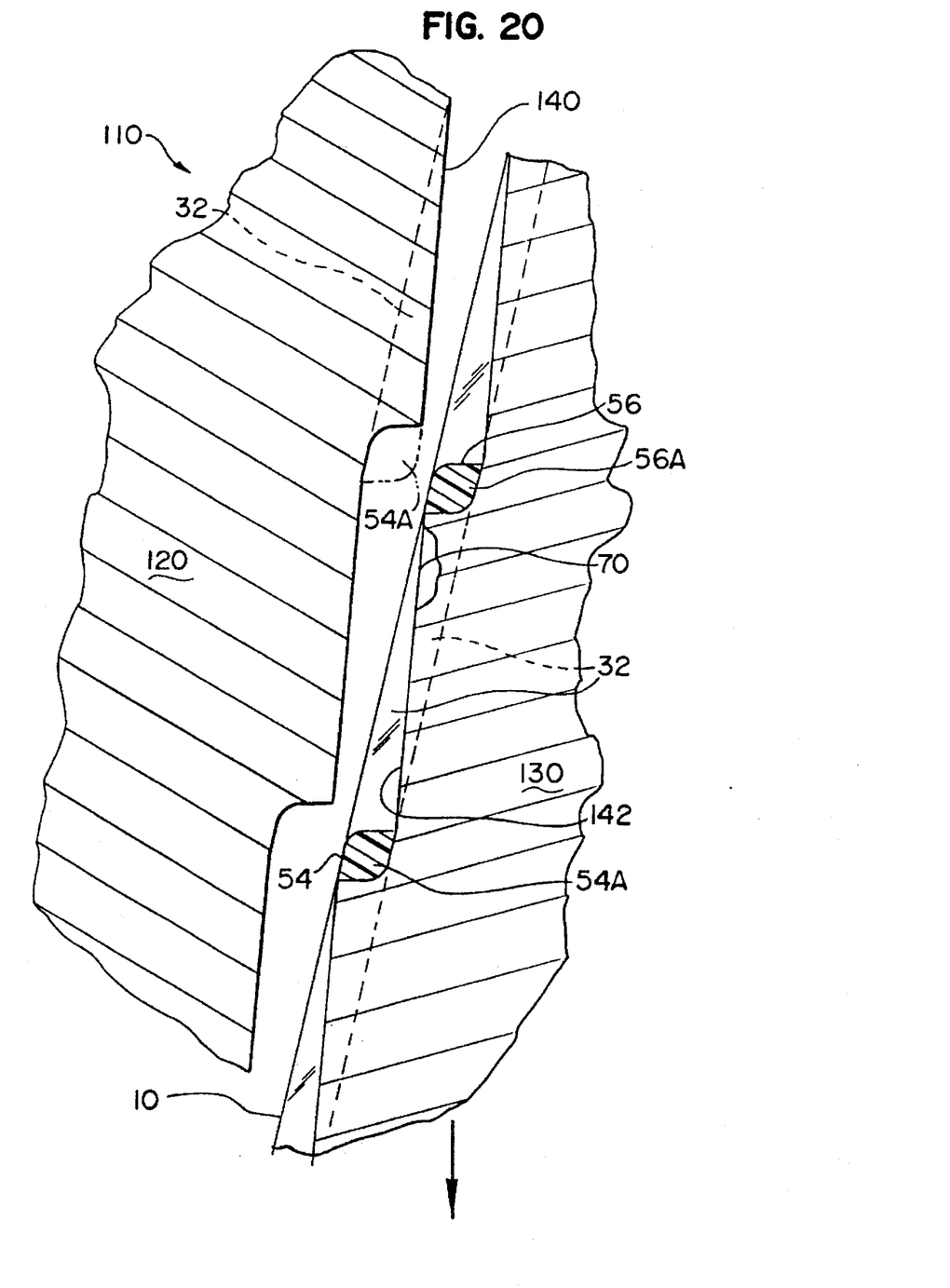
FIG. 20 is a greatly enlarged view of a detail portion of the mold assembly, similar to FIG. 17A, illustrating the mold parts of the mold assembly in the process of being separated to permit the resulting basket to be removed therefrom.

After the thermoplastic material injected into the mold 110 has cooled, the basket construction 10 is solidified and can be removed from the mold 110. In this regard, inner core mold portion 130 is disengaged from the outer cavity mold portion 120, wherein mating surfaces 140 and 142 are separated from one another. As best seen in FIG. 20, basket construction 10 rests on core mold portion 130 during disengagement from cavity mold portion 120 and is supported on mating surface 142 by cross members, such as cross members 54 and 56 having cross sectional areas 54A and 56A, respectively.

Diagonal parting lines, such as diagonal parting line 70, are exposed on the longitudinal rib members, such as longitudinal rib member 32.

Once the inner core mold 130 has been removed a sufficient distance, the basket construction 10 is removed from the inner core mold portion 130 by any conventional means.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of manufacturing a plastic open frame basket construction, comprising:

using a pair of complementary shaped mold members including an inner core member and an outer cavity member having a sprue;

forming a space between said mold members to define the basket construction, wherein said mold members are positioned in close proximity with one another;

said forming a space including forming a base cavity to define an inwardly dished base member having an outer edge portion to help rigidify the basket construction;

said forming a base cavity including forming a hub cavity to define a central hub having an exterior surface in said base member, forming radiating rib cavities to define a plurality of radiating rib members connected integrally between said hub and said outer edge portion, and forming base cross member cavities to define a plurality of base cross members connected integrally between adjacent radiating rib members to brace them for preventing relative movement between said radiating rib members and said base cross members, wherein said sprue is in fluid communication with said hub cavity;

said forming a space further including forming longitudinal rib cavities to define a plurality of longitudinal rib members connected integrally to said outer edge portion and extending axially away and radially outward from it to form an open framework for defining a tapered body portion, each of said longitudinal rib members having distal end portions and oppositely disposed side wall portions, wherein a plurality of pairs of facing side wall portions are defined by said side wall portions of adjacent longitudinal rib members;

said forming a space further including forming body cross member cavities to define a plurality of cross members connected integrally to said side wall portions of each of said pairs of facing side wall portions to brace said longitudinal rib members for enhancing the structural strength of said tapered body portion, each of said cross members having an exterior edge and an interior edge, wherein outer corners are defined by the intersection of said exterior edges and said facing side wall portions, and an interior corner is defined by the intersection of said interior edges and said facing side wall portions;

said forming a space further including forming a rim cavity to define a rim member connected integrally to said distal end portions to define an opening to said tapered body portion for allowing access therewithin;

introducing a thermoplastic material into the space through said sprue, wherein the thermoplastic material initially enters the hub cavity and flows therefrom through said radiating rib cavities, said base cross member cavities, said longitudinal rib cavities, said body cross member cavities and said rim cavity; and separating said complementary shaped mold members from one another, wherein a plurality of parting lines are formed along each of said side walls in a stepped configuration.

2. A method of manufacturing a plastic open frame basket construction according to claim 1, further comprising:

forming an exterior cross member parting line connected integrally to said exterior edge and a substantially parallel interior cross member parting line connected integrally to said interior edge extending the axial length of said cross member;

forming a plurality of webbed members at said upper corners and at said lower corners, wherein said web members form a plurality of continuous upwardly curved transitional edges between said exterior cross member parting lines and said diagonal parting lines, and said web members form continuous downwardly curved transitional edges between said interior cross member parting lines and said diagonal parting lines.

3. A method according to claim 1, further comprising forming a pair of bail receiving openings in said rim member, and coupling rotatably a bail with said bail receiving openings to facilitate carrying the basket construction.

4. A method according to claim 1, further comprising forming a plurality of stacking ribs within the interior of the basket construction at said base member to facilitate the nesting of like basket constructions.

* * * * *